(12) United States Patent
Cebon et al.

(10) Patent No.: US 8,548,683 B2
(45) Date of Patent: Oct. 1, 2013

(54) ACTIVE STEERING CONTROLLER

(75) Inventors: David Cebon, Cambridge (GB); Brian Jujnovich, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 426 days.

(21) Appl. No.: 12/670,481

(22) PCT Filed: Jul. 31, 2008

(86) PCT No.: PCT/GB2008/002614
§ 371 (c)(1),
(2), (4) Date: Jun. 15, 2010

(87) PCT Pub. No.: WO2009/019444
PCT Pub. Date: Feb. 12, 2009

(65) Prior Publication Data
US 2011/0202238 A1    Aug. 18, 2011

(30) Foreign Application Priority Data
Aug. 3, 2007  (GB) .................................. 0715142.6

(51) Int. Cl.
*A01B 69/00* (2006.01)
*G01C 21/00* (2006.01)
*B62D 53/00* (2006.01)
*B60P 1/64* (2006.01)

(52) U.S. Cl.
USPC .......... 701/42; 701/480; 180/14.2; 280/418.1

(58) Field of Classification Search
USPC ............... 701/7, 8, 71, 72, 81, 90, 29.3, 31.1, 701/32.9, 411, 466, 480, 500, 502, 501, 505, 701/509, 510, 511, 536.41–43, 536, 37, 41, 701/42, 53, 58, 60, 75, 82–84, 122, 479; 180/204, 6.2, 9.38, 9.42, 9.44, 14.4–14.7, 180/234, 408, 433, 440, 445, 14.2, 14.6, 180/9.4; 280/234, 240, 246, 263, 292, 400–408, 280/411.1, 418.1, 419, 442–448, 455.1, 467, 280/656, 43.13, 789, 124.115, 755, 426–441.2, 280/837, 839, 407.1, 423.1, 901
See application file for complete search history.

(56) References Cited

U.S. PATENT DOCUMENTS

| | | | | |
|---|---|---|---|---|
| 4,603,668 A | * | 8/1986 | Ueno | 123/352 |
| 5,289,892 A | * | 3/1994 | Notsu | 180/410 |
| 6,257,669 B1 | * | 7/2001 | Hicks | 298/8 T |

FOREIGN PATENT DOCUMENTS

| | | |
|---|---|---|
| EP | 0308263 | 3/1989 |
| EP | 0390288 | 10/1990 |
| EP | 0484668 | 5/1992 |
| EP | 0911246 | 4/1999 |

* cited by examiner

*Primary Examiner* — Muhammad Shafi
(74) *Attorney, Agent, or Firm* — Welsch Flaxman & Gitler LLC (57) ABSTRACT

A system for controlling a vehicle. The vehicle has a steerable front axle and at least one further steerable axle. The system determining the path of a reference lead point at the front of the vehicle and determining the path of a follow point at the rear of the vehicle. A controller for driving the at least one further steerable axle of the vehicle such that the deviation between the path of the lead point of the vehicle and the follow point is within a predetermined range while the vehicle is in motion.

11 Claims, 9 Drawing Sheets

Fig.9a.
Conventional
SWP = 5.77m
TS = 0.13m

Fig.9b.
Command Steer
SPW = 4.90m
TS = 0.58m

ACTIVE STEERING CONTROLLER

CROSS REFERENCE TO RELATED APPLICATIONS

The present application is the National Stage of International Application No. PCT/GB2008/002614, filed Jul. 13, 2008, entitled "ACTIVE STEERING CONTROLLER", which claims the benefit of Great Britain Patent Application No. 715142.6, filed Aug. 3, 2007, entitled "ACTIVE STEERING CONTROLLER".

BACKGROUND OF THE INVENTION (1) Field of Invention

The present invention relates to an active steering controller for heavy road vehicles with front and rear steerable wheels, such as a bus, or an articulated vehicle such as a tractor-semi-trailer.

(2) Description of Related Art

The use of long and large vehicles, many of which are articulated, is widespread as they have many advantages in terms of their flexibility of operation and large load carrying ability. However, given their length, there can be difficulties in controlling them safely. Their length and size reduce their maneuverability. Attempts have been made to improve the maneuverability of such vehicles by providing additional steerable axles at the rear of the vehicle and by splitting the vehicle into a number of components and articulating them. Such vehicles still have problems, however. In particular, articulated vehicles can be difficult to steer at low speeds, their movement can become cumbersome and it can be difficult to move them through corners and tight curves that smaller, less lengthy vehicles would have no difficulty in navigating. This restricts their use in built-up areas. Furthermore, such vehicles can become difficult to control at high speeds if, for example, emergency evasive action is required by the driver, with a "whip-crack" effect (also known as rearward amplification) occurring in the rear trailer of the vehicle, leading to instability and possible overturning of the vehicle.

Attempts have been made to improve the maneuverability of such vehicles by introducing steering wheels that are normally only steered at low speeds so that the whole vehicle can be driven to follow more closely the path intended by the driver. Such steering arrangements, sometimes called command steer systems, usually involve the provision of steerable wheels at the rear of the vehicle or in the trailer section of the vehicle. These wheels are steered by a steering mechanism or by mechanical actuators controlled by a computer to assist in maneuvering of the vehicle. Such systems can have benefits, but also have problems associated with them. Firstly, it is very difficult for the systems to cope well with both high and low speeds. A system which works well in assisting steering at low speeds to improve the maneuverability of the vehicle can introduce instability at high speeds unless it is disabled. Likewise, a system which operates to improve stability of the vehicle at high speeds can hinder the maneuverability of the vehicle at low speeds. In addition, prior art systems are unable to improve, to a significant degree, the handling characteristics of larger articulated vehicles with multiple trailer axles. Given this limited performance, and given the relative expense of such systems they have not become popular in commercial vehicle operations.

BRIEF SUMMARY OF THE INVENTION

The present invention seeks to provide a system which improves the maneuverability and handling of an articulated vehicle throughout its entire speed range, yet which is safe, reliable and cost effective.

According to the present invention there is provided a system for controlling an articulated vehicle, the vehicle having a steerable tractor unit and rotatably coupled trailer unit, with the trailer unit having at least one steerable axle, the system comprising:

means for determining the path of the point of connection of the tractor and trailer;

means for determining the path of the center of the rear of the trailer; and means for driving the steerable axle of the trailer such that the deviation between the path of the connection point of the tractor and trailer and the rear mid-point of the trailer is minimized whilst the vehicle is in motion.

The present invention, by seeking to drive the trailer such that it follows the path of the point of articulation between the tractor unit and the trailer ensures that, at all times, the vehicle follows an optimum path to make it as moveable as possible whilst ensuring that safety constraints are met. Furthermore, with the arrangement of the present invention, where the system is arranged to steer the trailer towards a path which follows the articulation point, even if it has deviated from that point, ensures safe operation even if the trailer cannot follow exactly at all times due to tire slip or steering constraints on the steerable axle or axles of the trailer.

The invention could also apply to a rigid vehicle in which case the objective is for the center of the rear of the vehicle to follow the path of the center of the front of the vehicle.

BRIEF DESCRIPTION OF THE DRAWINGS

An example of the present invention will now be described with reference to the accompanying drawings, in which.

DETAILED DESCRIPTION OF THE INVENTION

Figure 1:
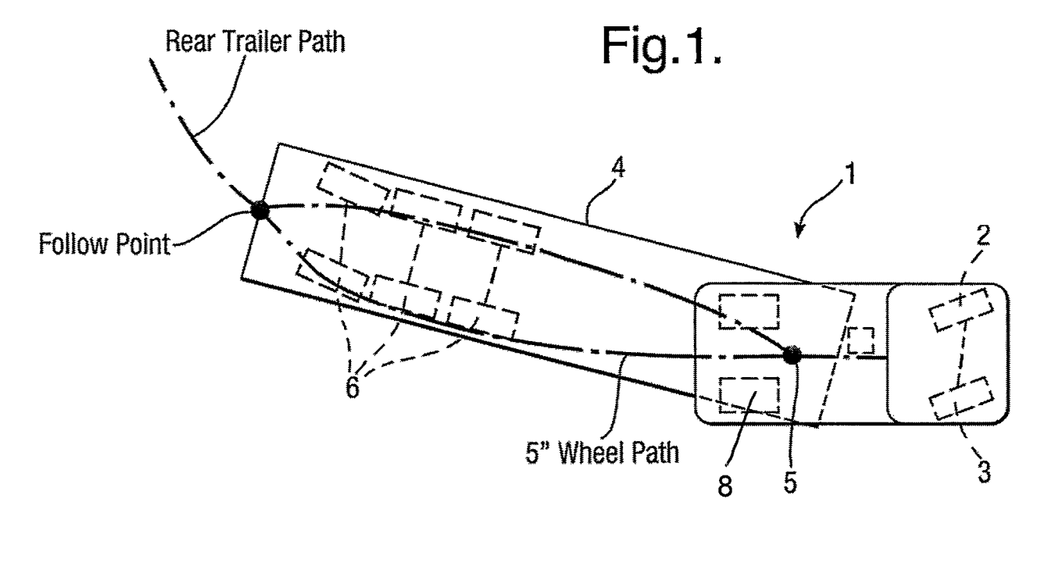
FIG. 1 is a schematic view, from above, of a vehicle employing a system of the present invention.

FIG. 1 shows an example of tractor 2 and trailer 4 forming a vehicle 1 employing the system of the present invention. The tractor 2 has steerable front wheels 3 and a single set of steerable rear wheels 8, although it could have more. The tractor unit 2 with steerable front wheels 3 has a trailer 4 rotatably connected to the tractor 2 at an articulation point 5 (sometimes referred to as the fifth wheel). The trailer 4 has three sets of steerable wheels 6 in this particular example, although it will be appreciated that fewer or larger numbers of steerable sets of wheels 6 on the trailer 4 could be provided. In operation a driver drives the tractor unit 2, steering it via wheels 3. The system of the present invention, with both types of vehicles (i.e. tractor and trailer), when operating, operates the axles of the sets of steerable wheels 6 to control movement of the trailer 4 in a manner which will be described below. It will be appreciated that the invention can also be applied to vehicles employing multiple trailers that are linked to one another either directly or through intermediate articulated dollies.

Figure 2A:
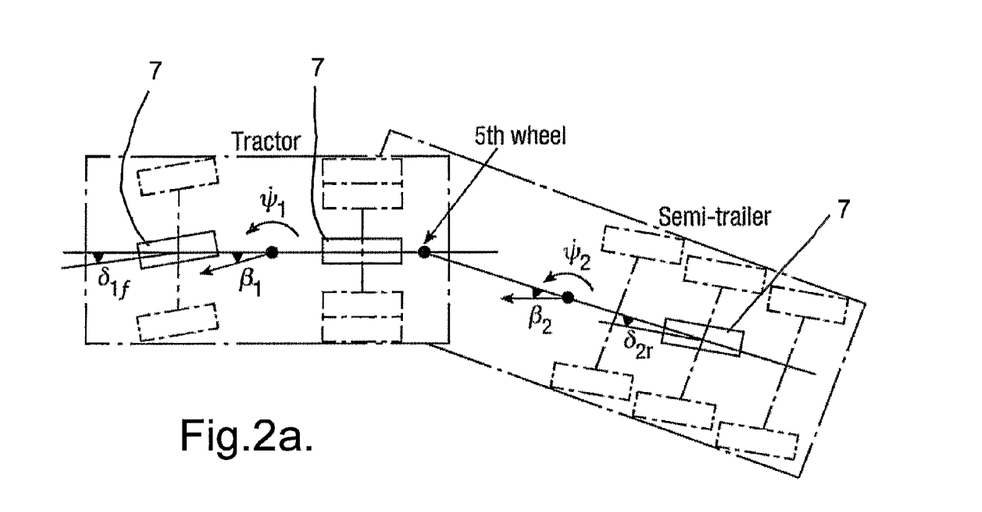
FIGS. 2a & 2b show yaw and roll motion of a vehicle.
Figure 2B:
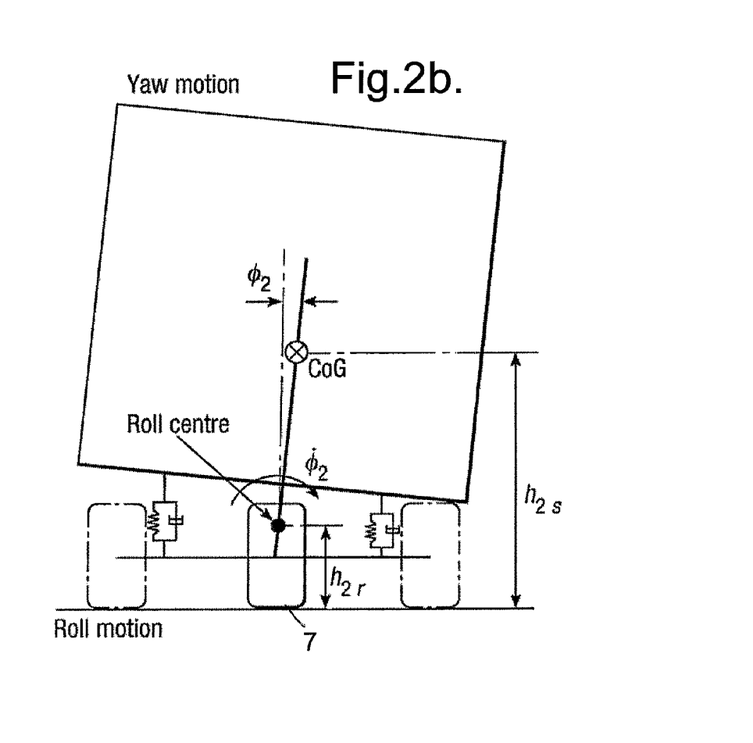
Figure 3:
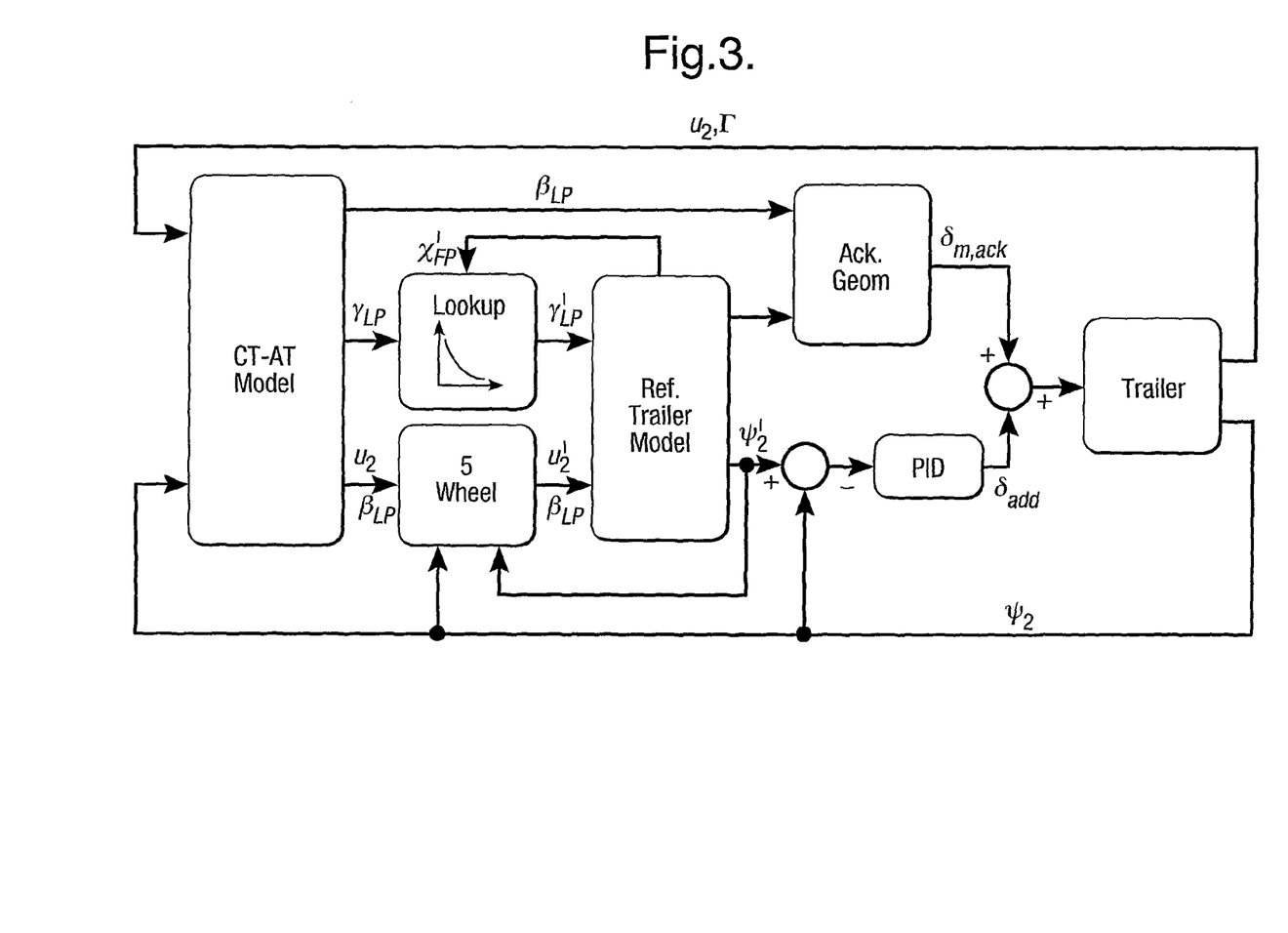
FIG. 3 is a block diagram showing the control system employed in the system of the present invention.

FIG. 2 shows plan and end views of an articulated vehicle employing the system of the present invention. It will be appreciated that the same principles apply to a non-articulated vehicle of the type described above. It shows the parameters for yaw motion and roll motion for the vehicle. The central wheels 7, shown in solid lines, are not present in reality, but are shown as the system of the present invention, in a simplified example, employs a simple "bicycle" model for control of the steering of the rear axle, which in this example is on the vehicle trailer. The bicycle model, employing a mathematical model with a single set of wheels central to the position of the pairs of wheels 6 of the central vehicle simplifies the calculations required for the control parameters by assuming that the yaw and roll motions can be modeled based upon a single set of central wheels, rather than two sets of spaced apart wheels. The yaw motion results from transverse forces generated by the tires of the vehicle when turning. The roll motion occurs as the vehicle turns at higher speeds due to the interaction between lateral acceleration due to the turning motion and suspension elements on the vehicle.

The articulated vehicle is modeled using two rigid bodies—the tractor and the semi-trailer. The freedom includes motions of tractor side-slip, tractor yaw and roll, semi-trailer yaw and roll.

For the simplification of controller design, there are some assumptions for the vehicle model as follows:

The forward speed is constant;
The tractor and semi-trailer units have no pitch or bounce;
There are no braking forces on any of the tires;
The angular displacements during the maneuvers are small and the articulation angle between the tractor and semi-trailer units is small;
The roll stiffness and damping of the vehicle suspension systems are constant at the range of roll motions involved.
The three axles of the semitrailer are combined to represent a single rigid body at the geometry center.
One tire is located at the center of the tractor front axle, the tractor rear axle and the semi-trailer axles, respectively (a bicycle model). The three tires are linear and only lateral tire forces are considered; and
The effects of side wind and road slope are neglected.

The present invention can be realized in a number of ways, many of which are determined by engineering constraints such as cost and the type of vehicle to which the system is being applied. We will describe, however, two examples. The first is a relatively simple approach which can be employed with a small number of motion sensors and with simplified control calculations. The second example is more complex, but allows for adaptation of the handling and path following characteristics dependent upon a number of factors to optimize vehicle performance.

Taking the first example, a simplified central strategy is employed.

In its simplest form the system of the present invention seeks to provide a path following strategy that ensures that a selected "follow" point on the vehicle (usually the middle of the rear thereof) follows as precisely as possible a selected "lead" point at the front (again, usually the articulation point). In a simple system it can be considered for this path following to be maintained regardless of vehicle speed, although this may not be the case in a more complex system, as will be described later. This simplified system implements the invention using, in general terms, the following steps:

1) Determine the heading angle of the lead point and the distance it has travelled down the path. Store the data for later retrieval.
2) Determine the distance the desired follow point has travelled down the path.
3) Use interpolation to find the heading angle of the lead point corresponding to the current position of the follow point. This forms the desired heading angle of the follow point.
4) Steer the wheels to make the heading angle of the follow point equal the desired value.
5) Under some circumstances, the steered wheels can reach their physical steering limits, such that it may not be possible to achieve step 4 as specified above. Consequently an alternative strategy in step (4) is to calculate in the controller, the trajectory of a theoretical "reference" trailer, with unlimited steering wheel angles, so as to follow the path of the lead point perfectly, using the information from step (3). The real trailer is then steered to have a path as close as possible to that of the reference trailer at all times.

The lead and following points are set as being the point of articulation (5th wheel between the tractor and trailer of the vehicle and the mid-point of the rear of the vehicle respectively. Selecting both points on the same rigid body simplifies the modeling of the system and control aspects. It also means that all the sensors that may be required by the controller are located on a single body.

The distance that the lead point has travelled down the path $\chi_{LP}$ can be found by integrating the absolute velocity of the lead point with respect to time. The origin for all path distance measurements is the initial location of the follow point. Therefore, $\chi_{LP}$ initially equals the distance between the rear of the trailer and the 5.sup.th wheel. The total distance is given by the following equation:

$$x_{LP} = \int_0^t \frac{u_2}{\cos(\beta_{LP})} \cdot dt + L_2 + d$$

where;
$u_2$ = trailer longitudinal velocity [m/s]
$L_2$ = trailer wheelbase [m]
$d$ = distance [m]
$\beta_{LP}$ = sideslip angle of the lead point of the trailer [rad]

In accordance with the general path following strategy the heading angle and distance travelled by the lead point are stored in a shift register in memory for later retrieval.

The next task is to determine the distance down the path of the follow point, located at the rear of the reference trailer. This requires the motion of the reference trailer first to be defined. The longitudinal velocity of the reference trailer $u'_2$ and the side-slip of the lead point relative to the reference trailer $\beta'_{LP}$ can be found by equating velocities and angles at the $5^{th}$ wheel:

$$u'_2 = u_2 \cdot \frac{\cos(\beta_{LP} + \psi_2 - \psi'_2)}{\cos(\beta_{LP})}$$

$$\beta'_{LP} = \beta_{LP} + \psi_2 - \psi'_2$$

where;
$\psi'_2$=yaw angle of tote reference trailer [rad]

The distance that the follow point on the reference trailer has moved down the path can then be determined by integrating its absolute velocity. Note that the initial value is zero because the origin is the initial location of the follow point:

$$x'_{FP} = \int_0^t \frac{u'_2}{\cos(\beta'_{FP})} \cdot dt$$

To determine the heading angle of the follow point on the reference trailer a lookup table is used. At each time step interpolation is performed to find the location in the shift register where the distance travelled by the lead point equals the current distance travelled by the follow point on the reference trailer. The corresponding value of the heading angle of the lead point is retrieved from memory and set as the demand heading angle of the reference trailer follow point $\gamma'_{FP}$.

Once the demand heading angle of the reference trailer follow point is known, the yaw angle of the reference trailer can be determined using the following equations:

$$\beta'_{FP} = \gamma'_{FP} - \psi'_2$$

$$\psi'_2 = \int \frac{(\tan(\beta'_{LP}) - \tan(\beta'_{FP})) \cdot u'_2}{L_2 + d} \cdot dt$$

The yaw angle of the reference trailer is used as the demand signal for controlling the steering on the real trailer. When the real trailer has the same yaw angle as the reference trailer, the side-slip angle at the rear of the real trailer should be equal to the side-slip angle at the rear of the reference trailer:

$$\beta_{FP} = \beta'_{FP}$$

This can be achieved with minimal lateral tire forces by steering each of the real trailer wheels so that they head in the direction of their velocity vector. At low speeds this is equivalent to using Ackermann geometry. The required steer angles are given by the equations below:

$$\delta_{3,ack} = \tan^{-1}\left(\left(\frac{d+e}{L_2+d}\right) \cdot \tan(\beta_{LP}) + \left(\frac{L_2-e}{L_2+d}\right) \cdot \tan(\beta_{FP})\right)$$

$$\delta_{4,ack} = \tan^{-1}\left(\left(\frac{d}{L_2+d}\right) \cdot \tan(\beta_{LP}) + \left(\frac{L_2}{L_2+d}\right) \cdot \tan(\beta_{FP})\right)$$

$$\delta_{5,ack} = \tan^{-1}\left(\left(\frac{d-e}{L_2+d}\right) \cdot \tan(\beta_{LP}) + \left(\frac{L_2+e}{L_2+d}\right) \cdot \tan(\beta_{FP})\right)$$

where;

$e$=distance [m]

If the real trailer does not have the same yaw angle as the reference trailer, an additional amount of steering is required to bring it into line. To do this lateral forces are generated by steering each of the wheels the same amount in relation to the error in yaw angle. A PID controller is used for this task. Since it is desirable for all wheels to generate the same lateral force, the same steering angle is added to each wheel:

$$\delta_{add} = K_{PID} \cdot (\psi'_2 - \psi_2)$$

where;

$K_{PID}$=PID controller gain(s) [–]

The final steer angles are determined by adding the additional steer angle to the Ackermann steer angle for each wheel:

$$\delta_m = \delta_{m,ack} + \delta_{add}$$

Sensors on the trailer provide measurements of the velocity $u_2$, articulation angle [ and yaw angle $\chi_2$ (integrated from yaw rate) which are fed into the bicycle model. The bicycle model is used to calculate the side-slip of the lead point, the heading angle and the distance travelled.

To make the controller work at high speeds, the way in which the side-slip of the lead point is calculated has to be modified and the PID controller has to be re-tuned. Other parts of the controller are based on equations that do not depend on the low-speed assumption and hence do not require alteration.

In the low-speed controller the side-slip of the lead point is determined directly from the tractor steer angles, the articulation angle and the geometry of the vehicle in a turn. At high speeds, however, the wheels begin to slip sideways and the side-slip of the lead point is no longer related to the steer and articulation angles by a simple geometric relationship. Hence a different method is required to calculate side-slip of the lead point at high speeds.

Side-slip can be measured using either optical or inertial/GPS sensors. It can also be estimated by combining the outputs of standard vehicle motion sensors, such as accelerometers and wheel velocity sensors, with an accurate vehicle model.

In the algorithm presented above, the PID controller determines how much the trailer wheels are steered in relation to the difference in yaw angle between the real trailer and the reference trailer. At low speeds, a simple proportional controller is found to work adequately. However, at high speeds this controller may become unstable and hence new PID gains may have to be determined.

A simplified model of the transfer function between steering and yaw angle of the trailer is:

$$H_{\psi/\delta}(s) = \frac{1}{\frac{I_2 + a^2 m_2}{3L_2 C} s^2 + \frac{L_2}{u_2} s + 1}$$

where;
$I_2$ trailer yaw moment of inertia [kg.m$^2$]
$a$=distance from $5^{th}$ wheel to trailer COG [m]
$m_2$=trailer amass [kg]
$L_2$=trailer wheelbase [in]
$C$=tyre cornering stiffness [N/rad]
$u_2$=trailer longitudinal velocity [m/s]

The PID controller uses an open-loop shaping technique. For good closed-loop performance it is desired to have high gain at low frequencies and low gain at high frequencies. In addition, to avoid exciting roll, the crossover frequency should be around 1 Hz (higher than the frequency of a severe maneuver but less than the roll frequency). Finally, the phase margin should be greater than 60° for stable operation.

A combined controller can be implemented including aspects of both the high and low-speed controllers. In the combined controller a low-speed, feed-forward controller performs the majority of the control task using wheel speed and articulation angle sensors. A high-speed, feedback controller corrects the primary controller using yaw rate and side-slip sensors. The two controllers ensure good operation across the whole speed range and offer a level of redundancy.

The feed-forward controller is a simplified version of the low-speed controller presented above. In addition to not using feedback, the feed-forward controller does not employ a reference model of the trailer unit or account for the longitudinal offset of the $5^{th}$ wheel from the drive axle. Any errors caused by these simplifications are corrected by the feedback controller. The feedback controller also accounts for the additional side-slip of the $5^{th}$ wheel at higher speeds.

The feed-forward controller sets the side-slip angle of the lead point $\beta_{LP}$ equal to the articulation angle. It then determines the heading angle of the lead point $\gamma_{LP}$ and the distance the lead point has travelled down the path $\chi_{LP}$ using the above equations. The distance the follow point has travelled down the path $\chi_{FP}$ is also determined:

$$x_{FP} = \int_0^t \frac{u_2}{\cos(\beta_{FP})} \cdot dt$$

The above values are stored in a shift register. At each time step, interpolation is performed to calculate the heading angle of the follow point $\gamma_{FP}$. The side-slip angle of the follow point and the yaw angle of the trailer are then determined:

$$\beta_{FP} = \gamma_{FP} - \psi_2$$

$$\psi_2 = \int \frac{(\tan(\beta_{LP}) - \tan(\beta_{FP})) \cdot u_2}{L_2 + d}$$

The above Equations are used to calculate the angle to steer each of the trailer wheels in accordance with Ackermann geometry.

The governing equations for the feedback controller are the same as those used to calculate $\delta_{add}$ in the high-speed controller. The equations determine the additional amount of steering required to bring the real trailer back in line with the feedback controller=s reference trailer. The PID gains from the high-speed controller were found to work well in the feedback controller.

The final steer angles are determined by adding the steer angles from the feed-forward controller to the additional steer angle from the feedback controller. At high speeds, it is found that the feed-forward controller tends to steer the wheels in the opposite direction to the feedback controller. This increases the amount of correction the feedback controller has to apply. To reduce this effect the contribution of the feed-forward controller is progressively reduced at speeds above 40 km/h. This is accomplished by multiplying the steer angles by a >transition gain= that varies with speed.

Figure 7:
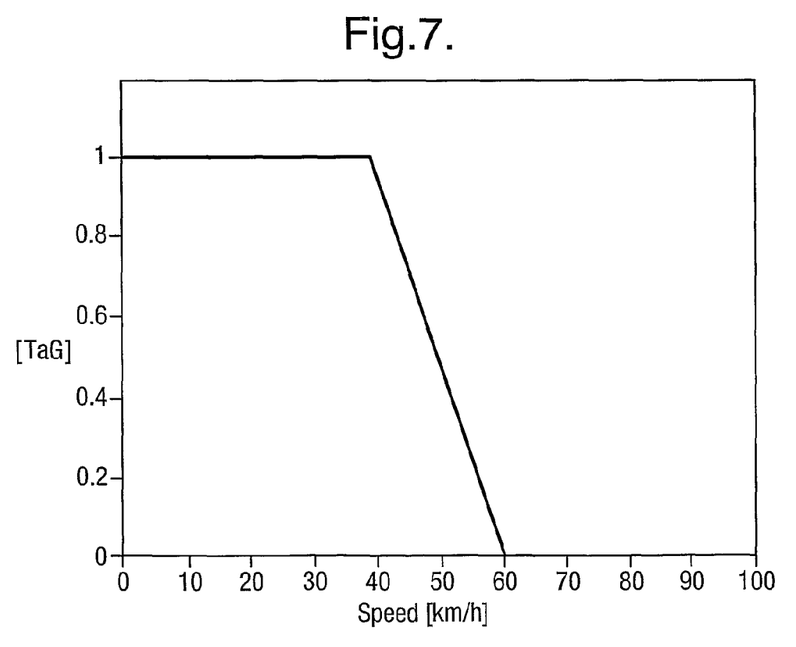
FIG. 7 is a graph showing variation in transition gain with speed for the system of the present invention.

This transitional gain is shown, as an example, in FIG. 7, where it can be seen that the gain is high at low speeds, but zero at higher speeds, with a transition in between which avoids the driver feeling any sudden sharp change in vehicle handling characteristics with increasing or decreasing speed. This feature can be combined with the control characteristics referred to above in a control system shown schematically in FIG. 8. In this, the feedback model described above, with side-slip and yaw sensor feedback is combined with a transition gain controlled to provide an overall control to the trailer which ensures optimum handling at any speed.

Figure 8:
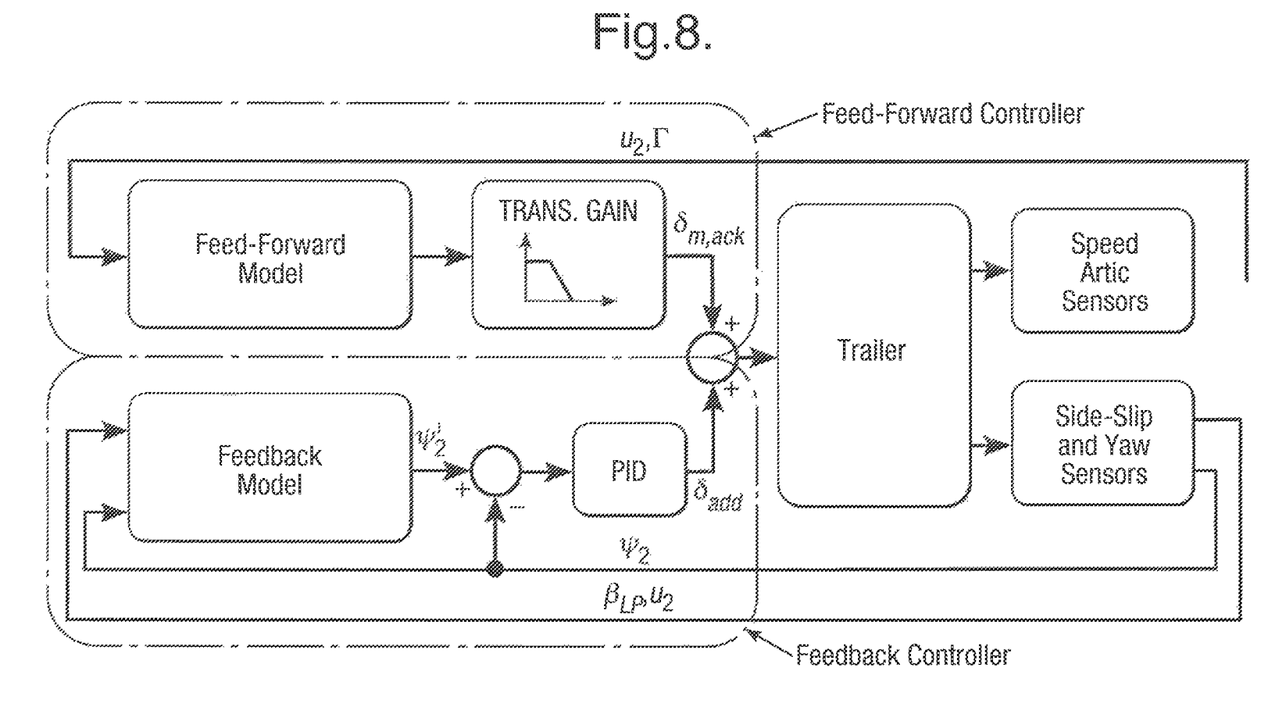
FIG. 8 is a block diagram showing a combined controller for a trailer employing the system of the present invention.

The feed-forward controller receives the articulation angle and trailer velocity as inputs from trailer-based sensors. It then calculates the amount each wheel needs to be steered to achieve low-speed path following. The wheel angles are multiplied by the transition gain to reduce the contribution of feed-forward steering at high speeds.

The feedback controller receives the side-slip at a point on the body, the trailer velocity and yaw angle as inputs from additional trailer-based sensors. It compares the yaw angle of the real vehicle to that of a reference trailer with perfect path following. The difference between the results is fed into a PID controller to determine the additional amount of steering required to make the real trailer coincide with the reference model. The steer angle from the feedback controller is added to each of the steer angles from the feed-forward controller (one per steered axle) and used to control the real vehicle.

The combined controller separates the feed-forward and feedback tasks and therefore has two main advantages over the previous semi-trailer controllers. Firstly, the combined controller offers a level of redundancy which enhances the safety of the system. Different sensors are used as inputs to the feed-forward and feedback controllers, which could be run on separate ECU=s. Therefore if one set of sensors or ECU stops working the trailer can still be steered, be it with some reduction in performance. If the feed-forward controller fails the feedback controller will maintain path following but will not minimize lateral tire forces. If the feedback controller fails the feed-forward controller will maintain path following at low speeds but will lock at high speeds. Either way safe operation is maintained allowing the vehicle to return to its base to have the fault rectified.

This redundancy is important considering the nature of many of the proposed side-slip sensors. Current optical sensors and GPS drop out occasionally, e.g. due to water on the road or passing through a tunnel. It is important that safety is not compromised if this occurs.

Secondly, the combined controller allows the possibility of using different actuators to perform the feed-forward and feedback tasks. The feed-forward controller could provide an input to control a long stroke, low bandwidth actuator that would perform a majority of the steering, especially at low speeds. The feedback controller could provide an input to a separate short stroke, high bandwidth actuator connected in series that would provide small correcting adjustments.

Whilst the above example provides significant improvement when compared to prior art systems, yet further benefits can be provided by introducing further complexity into the control system. In particular, it is possible to introduce additional parameters and cost functions for the control mechanism to adapt the control characteristics dependent upon vehicle parameters such as vehicle load, particular vehicle operation and vehicle speed. Such as system can require additional sensors to detect further vehicle parameters such as steering force, and lateral acceleration of the vehicle and can also provide a more accurate indication of path error via the employment of location sensors such as, for example, a global positioning system. Such a system will now be described. The equations representing the motions of the vehicle are listed below.

The equations of motion of the tractor semi-trailer vehicle in FIG. 2 can be expressed in state-space representation:

$$\dot{x} = Ax + B_o u + B_1 \delta$$

where x is a vector of vehicle states δ is the steer angle of the front wheels of the tractor and A, $B_0$, $B_1$ are matrices of vehicle parameters.

The discrete time version of the equations of the vehicle model can be written.

$$x(n+1) = A_d x(n) + B_{od} u(n) + B_{id} S_{1f}(n)$$

Figure 4:
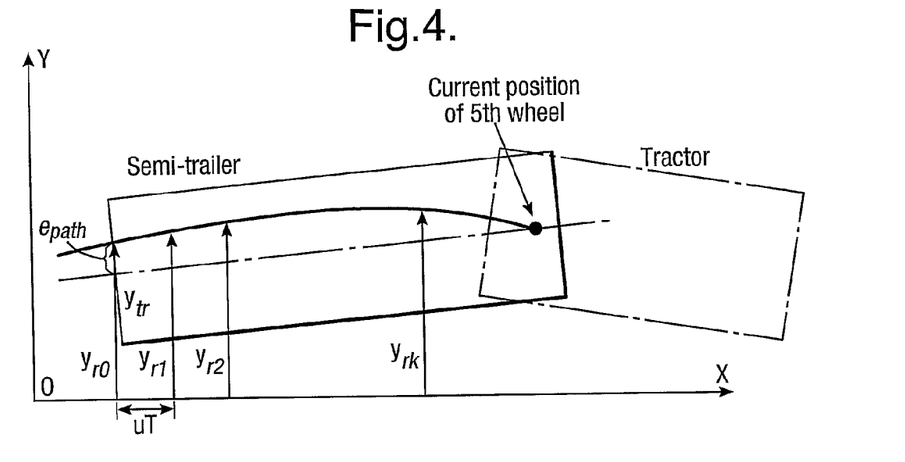
FIGS. 4 and 5 show path deviations in two different reference systems.
Figure 5:
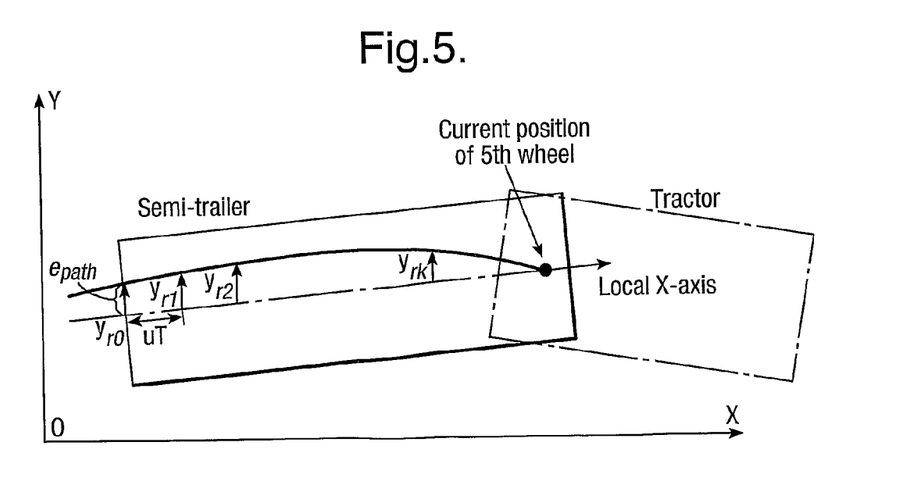
Figure 6:
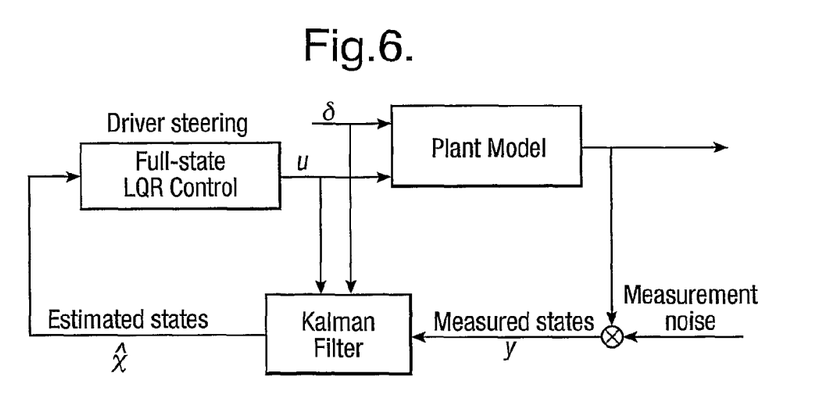
FIG. 6 shows a control model for the system of this invention.

FIGS. 4 and 5 show two possible reference systems that can be employed by the system of the present invention. The first of these measures deviation of the vehicle from a desired path by reference to a global location system with a single origin point. The system of the present invention employs such an arrangement when using vehicle component location, which is at least partially based upon a global positioning system or similar locating arrangement. FIG. 5 shows the reference system used when an alternative or supplementary approach is taken, that of a vehicle-fixed reference system, where a single point on the vehicle is used as the origin of the reference.

Referring firstly to FIG. 4 and the use of a global coordinate system, the lateral deviation of trajectory of 5th wheel, from a fixed straight line in global coordinate system, is defined at the sampling times nT, corresponding to the vehicle forward speed (see FIG. 4).

The path tracking error of trailer rear end ($e_{path}$) is defined as the lateral deviation of trailer rear end with respect to the trajectory of 5th wheel.

The lateral deviation of trajectory of 5th wheel, $y_r$, from a fixed straight line in global coordinate system, is defined at the sampling times nT, corresponding to the vehicle forward speed (see FIG. 4).

The path tracking error of trailer rear end ($e_{path}$) is defined as the lateral deviation of trailer rear end with respect to the trajectory of the $5^{th}$ wheel.

The updating process of previewed lateral deviation of trajectory of 5th wheel involves a shift register operation when going from n to (n+1) in time. It is described mathematically as by:

$$y_r(n+1) = D \cdot y_r(n) + E \cdot y_n$$

where Yr, is a vector of length (k)1, and $$y_r = [y_{r0} y_{r1} \ldots y_{r(k-1)} y_{rk}]^T \cdot y_{ri}$$

is the input to the trajectory of $5^{th}$ wheel.

$$D = \begin{bmatrix} 010 & \ldots & 00 \\ 001 & \ldots & 00 \\ 000 & \ldots & 00 \\ & & \\ 000 & \ldots & 01 \\ 000 & \ldots & 00 \end{bmatrix}$$

and $$E = [000 \ldots 01]^T$$

Combining the discrete time equations for the linear vehicle model with those for the trajectory of 5th wheel, we get:

$$\begin{bmatrix} x(n+1) \\ y_r(n+1) \end{bmatrix} = \begin{bmatrix} A_d & 0 \\ 0 & D \end{bmatrix} \begin{bmatrix} x(n) \\ y_r(n) \end{bmatrix} + \begin{bmatrix} 0 \\ E \end{bmatrix} y_{ri} + \begin{bmatrix} B_{0d} \\ 0 \end{bmatrix} u(n) + \begin{bmatrix} B_{1d} \\ 0 \end{bmatrix} \delta_{1f}(n)$$

The relationship between the vehicle body and the trajectory of 5th wheel is constructed by specifying a cost function for optimization.

For perfect path following, the objective is to minimize the path tracking deviation of trailer rear end. And the cost function is $$J = \sum_{n=0}^{\infty} \{Z^r(n) Q' Z(n) + R(u(n))^2\}$$

where $$Z = [x \quad y_r]_2^r \text{ and } u = \delta_{2r}$$

By suitable choice of the weighting matrices Q and R the cost function becomes $$J = \sum_{n=0}^{\infty} \{q_1 \{e_{path}\{n\}\}\}^2 + r\{\delta_{2r}\{n\}\}^2\}$$

where $= e_{path} = y_{r0} - (y_2 - l_{2e}\psi_2)$, $Q = q_1$ and $R = r$ $y_2$ is the absolute lateral position of the trailer and y2 is the yaw angle of the trailer.

A gain matrix K can be found to minimize the cost function using the formal methods of optimal control theory (Riccatti equation). The steering system can then be controlled using a control action of the form.

$$U = Kz$$

The above use of a global reference system is accurate for monitoring cornering with small angles. However, large errors can be introduced with such a system when updating the lateral deviation of the path of the fifth wheel and calculating the path tracking deviation of the trailer rear end. The system effectively adjusts the x-axis at each time step to align with the current direction of the trailer center line. Referring FIG. 5, the preview information of path tracking deviation is then sampled in a way similar to that stated above in respect of FIG. 4 but independent of the previous samplings. Accordingly, an improvement can be employed that makes a transformation that preserves the optimal performance of the steering controller and converts the path preview problem from a global coordinate system to a vehicle-fixed coordinate system.

The steps of the coordinate system transformation are:

a) The path deviations are calculated in vehicle-fixed coordinate system, which is shown in FIG. 5.

b) The optimal controller remains invariant except that the controller terms $K_{y2}y_2$ and $K_{\psi 2}\psi_2$ are set to 0.

In order to calculate the previewed lateral deviations in vehicle-fixed reference system, firstly the position of 5th wheel is calculated every time step based on the vehicle states and stored. Then the preview point on the center line of trailer body is calculated using the information of vehicle states and time step. A line from the preview point perpendicular to the trailer center is determined and the corresponding point on the trajectory of 5th wheel can be interpolated using the stored information of 5th wheel positions. Finally previewed lateral deviations can be determined easily.

Since the lateral acceleration of the trailer has a significant relationship with the roll stability of heavy vehicles, the lateral acceleration of trailer body is chosen as the control objective for rollover prevention.

It can be expressed in discrete-time equation as:

$$a_{y2}(n) = E_d x(n) + F_d u(n)$$

So combining the control objective of path tracking deviation of trailer rear end, the vector of control objectives becomes:

$$\begin{bmatrix} e_{pos}(n) \\ a_{y2}(n) \end{bmatrix} = C_d z(n) + D_d u(n)$$

With appropriate choice of matrices $C_d$, $D_d$, $E_d$ and $F_d$

By appropriate choice of weighting matrices, the cost function the becomes:

$$J = \sum_{n=0}^{\infty} \{q_1(e_{path}(n))^2 + q_2(a_{y2}(n))^2 + r(\delta_{2r}(n))^2\}$$

A gain matrix K can again be found to minimize the cost function, using the formal methods of optimal control theory (Ricatti equation). The steering system can then be controlled using a control action of the form u=Kz.

For the implementation of the controller above, some vehicle states need to be known. The roll rate and yaw rate can be measured inexpensively using gyros. It is a challenge to obtain good measures of lateral velocities. One way of obtaining these signals is to use optical sensors that sense motion of the road surface relative to the vehicle. However this is expensive and not very robust. Another way is to estimate the lateral velocities using sensors to measure parameters such as steering wheel angle, roll rate, yaw rate and lateral acceleration. This is the approach taken by the invention by use of a state estimator using linear vehicle model with Kalman filter.

A significant benefit of employing a cost function is that the weighting factors $q_1$, $q_2$, and r can be varied dependent upon the desired performance characteristics. For example, in many circumstances it is important to give the most significant weight to the path following aspect, making the weighting parameter $q_1$ large compared to the other parameters. However, there are certain circumstances, for example during high-speed emergency maneuvers or other high lateral acceleration conditions, wherein it may be considered acceptable not to follow the path with perfect accuracy but rather to maintain the path following error within a preset limit while ensuring that control is performed to give greatest importance to minimizing lateral acceleration. This is achieved by increasing the values of $q_2$ as required. In a more complex control these weighting factors can be varied almost continuously dependent upon the load on the vehicle, its speed and other factors. Indeed, one benefit of this arrangement is its ability in certain circumstances, to minimize lateral acceleration at the rear of the vehicle and hence minimize "reward amplification" in multiple trailer vehicles.

Figure 9A:
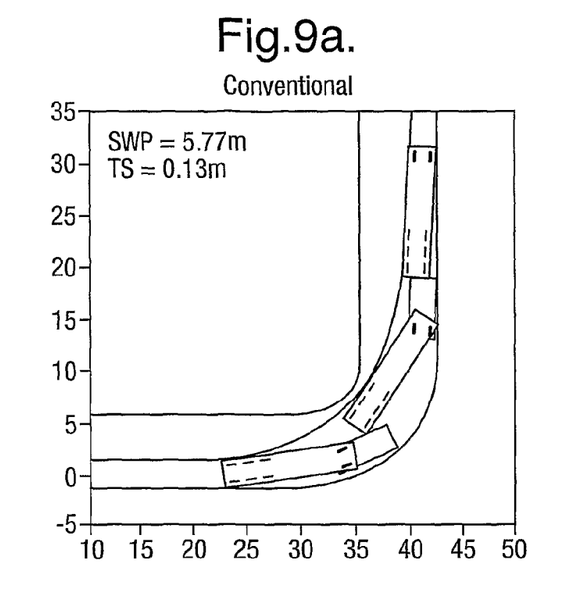
FIGS. 9a-c are a series of diagrams showing the path of a vehicle through a sharp corner employing a conventional control system, a command steer system and the system of the present invention.
Figure 9B:
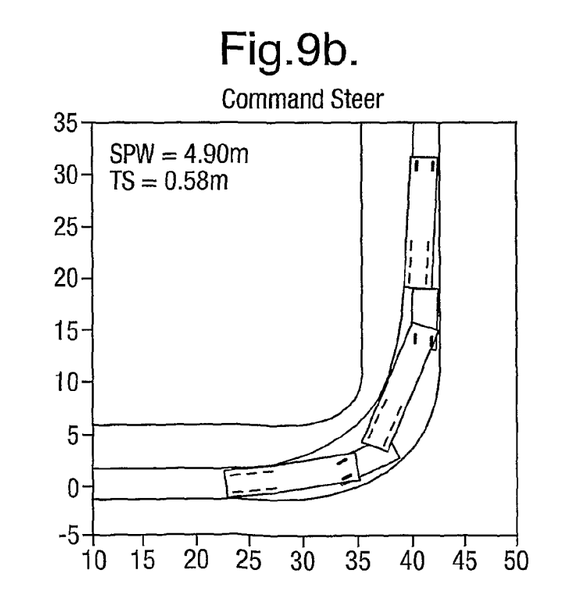
Figure 9C:
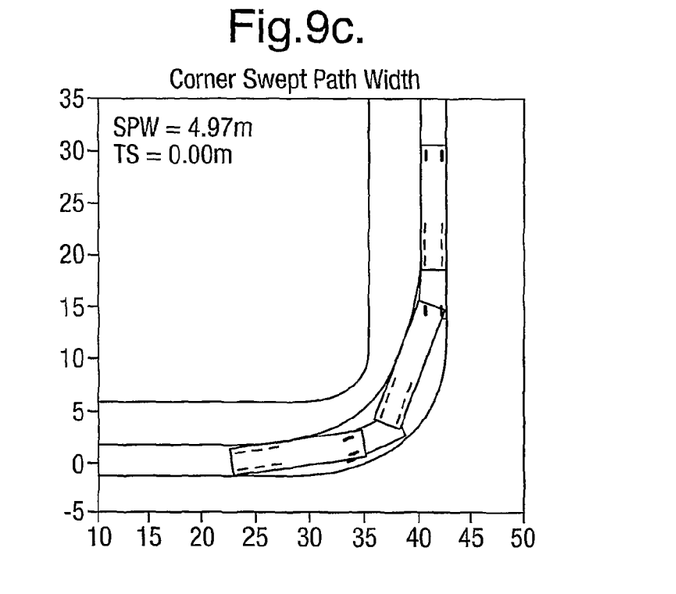
Figure 10A:
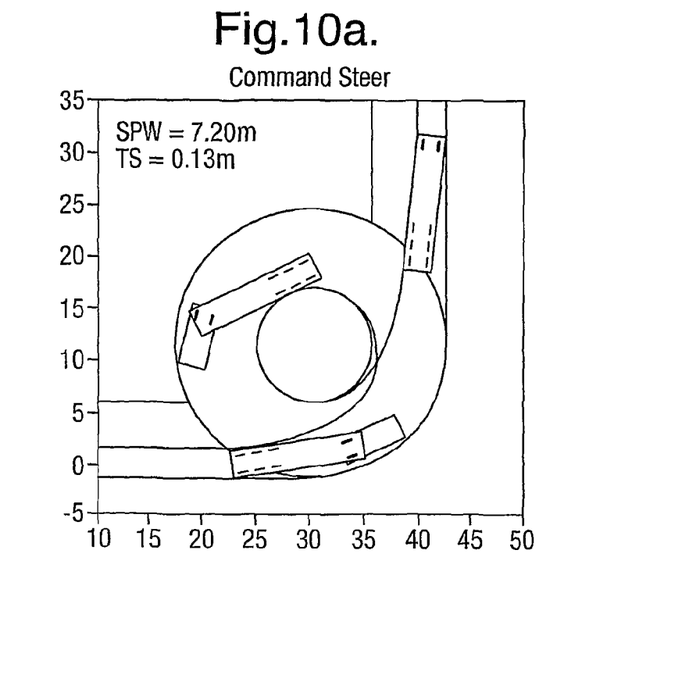
FIGS. 10a-c are a series of diagrams showing a conventional vehicle, a command steer system and a vehicle employing the system of the present invention travelling around a roundabout.
Figure 10B:
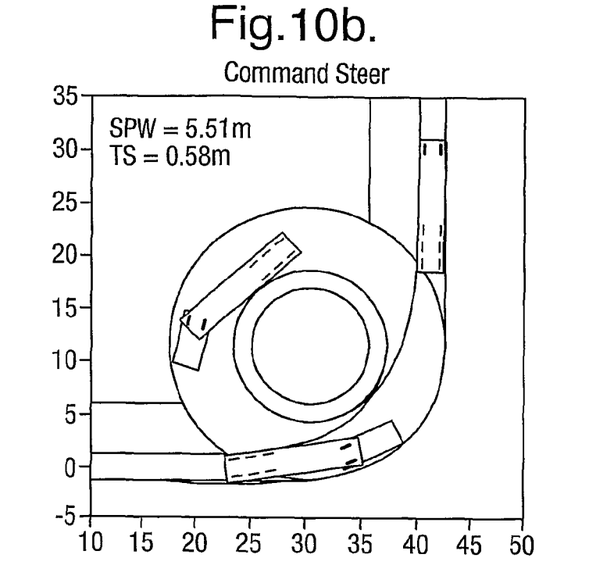

FIGS. 9a-c and 10a-c show the improvement of low speed path following characteristics of a vehicle employing the system of the present invention when compared to prior art vehicle control systems. FIGS. 9a and 10a show a vehicle going around a standard 90 degree bend and a roundabout. From this it can be seen that the conventional vehicle cuts across the road in both cases, actually requiring the full width of the road in the roundabout case to be able to pass around it. FIGS. 9a and 10a both show a variation on a standard vehicle in which steerable wheels are provided on the trailer using the commonly employed "command-steer" strategy, in which the trailer wheels are steered in proportion to the articulation angle between tractor and trailer vehicle units. This provides some improvement when the vehicle passes around a 90 degree bend and also in the roundabout situation when compared to a conventional vehicle. But the rear end of the trailer is prone to swing outside the path of the tractor unit at the entrance to the turn as shown in FIGS. 9b and 10b. Such "tail swing" can be dangerous because it occurs outside of the driver's field of vision in a "blind spot". Not shown in the figures, is the fact that at high speed such an approach to steering the rear axles of the trailer can lead to high levels of instability in the trailer if a driver has to maneuver quickly to avoid an obstacle, which can result in rollover.

Figure 10C:
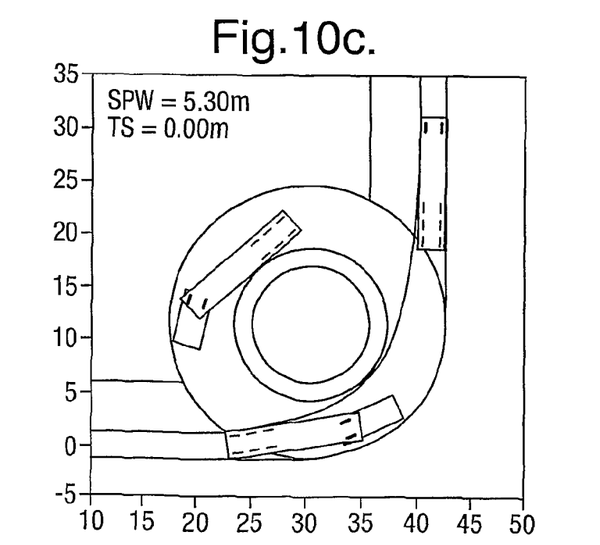

FIGS. 9c and 10c show the control system of the present invention being employed in the vehicle. From this it can be seen that the vehicle encroaches to an even lesser degree into the width of the road both during a 90 degree turn and during passage round a roundabout and has zero tail swing on entry to the turn. This clearly improves the safety of the vehicle. Furthermore, because of the employment of the path following control system described above, particularly when used with a transitional gain characteristic and consideration of yaw and roll characteristics, high speed handling of the vehicle can be improved relative to both the convention vehicle and the command-steer vehicle.

The invention claimed is:

1. A system for controlling a vehicle, the vehicle having a steerable front axle and at least one further steerable axle, the system comprising: means for determining the path of a reference lead point at the front of the vehicle; means for determining the path of a follow point at the rear of the vehicle; and means for driving the at least one further steerable axle of the vehicle such that the deviation between the path of the lead point of the vehicle and the follow point is within a predetermined range whilst the vehicle is in motion.

2. The system of claim 1, wherein the predetermined range for the deviation is set to minimize the deviation.

3. The system of claim 1, wherein the vehicle is an articulated vehicle having a steerable tractor unit and rotatably coupled trailer unit, with the trailer unit having at least one steerable axle, the lead point is the point of connection of the tractor and trailer and the follow poi at the rear of the vehicle is at the rear of the trailer.

4. The system of claim 3, wherein the position of the connection point of die tractor and trailer is determined by one or more of an inertial navigation system, global positioning system or combination of vehicle motion sensors and an estimation algorithm.

5. The system of claim 3, wherein the path of the follow-point of the trailer is determined by at least one of the group of an inertial navigation system, global positioning system or combination of vehicle motion sensors and an estimation algorithm.

6. The system of claim 3, wherein the path of the follow point of the trailer is measured by measuring side-slip of the rear of the mid-point of the trailer is determined by measuring side-slip at a point on the trailer and yaw rate of the trailer.

7. The system of claim 3 wherein a controller calculates the trajectory of a theoretical reference trailer which has unlimited steering wheel angles, and can achieve perfect path tracking for all conditions; the controller controlling the steerable angles of the steerable axles being controlled so as to minimize the difference between the reference trailer and the real trailer.

8. The system of claim 1, wherein the means for controlling the at least one further steerable axle includes a closed loop feedback controller, the gain for the closed loop being varied dependent upon the speed of the vehicle.

9. The system of claim 1, wherein the range for acceptable path-following error is increased and wherein the means for controlling the at least one further steerable axle includes a closed loop state-feedback controller, the controller generating a control signal for the at least one further steerable axle based upon data which combines the path deviation of the follow point, the lateral acceleration of the vehicle and the steering force being applied to the vehicle the steerable axles in a cost function.

10. The system of claim 9, wherein the control signal is generated by a feedback controller which is designed by providing a weighting coefficient to each of the path deviation, lateral acceleration and the steering force.

11. The system of claim 10, wherein the values of the weighting coefficients are dependent upon vehicle parameters such as load and speed.

* * * * *

UNITED STATES PATENT AND TRADEMARK OFFICE
CERTIFICATE OF CORRECTION

PATENT NO. : 8,548,683 B2
APPLICATION NO. : 12/670481
DATED : October 1, 2013
INVENTOR(S) : David Cebon et al.

It is certified that error appears in the above-identified patent and that said Letters Patent is hereby corrected as shown below:

In the Claims

Column 12, line 35 thru line 45, cancel the text beginning with "3. The system of" to and ending "an estimation algorithm", and insert the following claims:

-- 3. The system of claim 1, wherein the vehicle is an articulated vehicle having a steerable tractor unit and rotatably coupled trailer unit, with the trailer unit having at least one steerable axle, the lead point is the point of connection of the tractor and trailer and the follow point at the rear of the vehicle is at the rear of the trailer.

4. The system of claim 3, wherein the position of the connection point of the tractor and trailer is determined by one or more of an inertial navigation system, global positioning system or combination of vehicle motion sensors and an estimation algorithm. --

Column 12, line 66 through Column 13, line 7, cancel the text beginning with "9. The system of" to and ending "a cost function", and insert the following claim:

-- 9. The system of claim 1, wherein the range for acceptable path-following error is increased and wherein the means for controlling the at least one further steerable axle includes a closed loop state-feedback controller, the controller generating a control signal for the at least one further steerable axle based upon data which combines the path deviation of the follow point, the lateral acceleration of the vehicle and the steering force being applied to the vehicle by the steerable axles in a cost function. --

Signed and Sealed this
Twelfth Day of November, 2013

Teresa Stanek Rea
*Deputy Director of the United States Patent and Trademark Office*